United States Patent
Loch et al.

(10) Patent No.: US 11,741,237 B2
(45) Date of Patent: Aug. 29, 2023

(54) CONTENT-DRIVEN DEBUGGING BY TAINT TRACKING ALONG DATA FLOWS

(71) Applicant: SAP SE, Walldorf (DE)

(72) Inventors: Florian Loch, Karlsruhe (DE); Benny Rolle, Karlsruhe (DE)

(73) Assignee: SAP SE, Walldorf (DE)

( * ) Notice: Subject to any disclaimer, the term of this patent is extended or adjusted under 35 U.S.C. 154(b) by 541 days.

(21) Appl. No.: 16/722,564

(22) Filed: Dec. 20, 2019

(65) Prior Publication Data
US 2021/0192052 A1 Jun. 24, 2021

(51) Int. Cl.
*G06F 21/57* (2013.01)
*G06F 11/36* (2006.01)
*G06F 21/62* (2013.01)

(52) U.S. Cl.
CPC ........ *G06F 21/577* (2013.01); *G06F 11/3636* (2013.01); *G06F 11/3664* (2013.01); *G06F 21/62* (2013.01)

(58) Field of Classification Search
None
See application file for complete search history.

(56) References Cited

U.S. PATENT DOCUMENTS

| | | | | |
|---|---|---|---|---|
| 6,892,325 B2 * | 5/2005 | Bates | ................... | G06F 11/3664 714/E11.21 |
| 9,507,943 B1 * | 11/2016 | Allen | ...................... | G06F 21/56 |
| 10,129,285 B2 | 11/2018 | Johns et al. | | |
| 2007/0079292 A1 * | 4/2007 | Chen | ..................... | G06F 11/362 717/127 |
| 2011/0145918 A1 * | 6/2011 | Jung | ...................... | G06F 21/552 726/22 |
| 2013/0086676 A1 * | 4/2013 | Chess | .................... | G06F 21/554 726/22 |
| 2019/0018985 A1 | 1/2019 | Rolle et al. | | |
| 2019/0073473 A1 * | 3/2019 | VanderLeest | ....... | G06F 21/6218 |
| 2019/0205532 A1 | 7/2019 | Loch et al. | | |

OTHER PUBLICATIONS

Extended European Search Report for European Patent Appl. No. 20188374.1, 8 pages, dated Jan. 14, 2021.
Clause, J. et al., "Dytan: A Generic Dynamic Taint Analysis Framework," Proceedings of the ISSTA '07, Jul. 9, 2007, pp. 196-206.
Greathouse, J.L. et al., "Testudo: Heavyweight Security Analysis via Statistical Sampling," 41st International Symposium on Microarchitecture, Nov. 8, 2008, pp. 117-128.
Communication pursuant to Article 94(3) EPC, European Patent Appl. No. 20188374.1, 8 pages, dated Feb. 24, 2023.
She, D. et al., "Neutaint: Efficient Dynamic Taint Analysis with Neural Networks," IEEE Symposium on Security and Privacy, pp. 1527-1543, May 18, 2020.

* cited by examiner

*Primary Examiner* — Lewis A Bullock, Jr.
*Assistant Examiner* — Mark A Gooray
(74) *Attorney, Agent, or Firm* — Sterne, Kessler, Goldstein & Fox P.L.L.C.

(57) ABSTRACT

Disclosed herein are system, method, and computer program product embodiments for conducting taint analysis on inputted data from a user to a process, where based on pre-defined rules, input data may be marked as tainted. In a passive mode, logging or deletion actions may be taken on the tainted data. In an active mode, the process may be interrupted and a user prompt may be displayed each time a taint point is reached.

20 Claims, 6 Drawing Sheets

CONTENT-DRIVEN DEBUGGING BY TAINT TRACKING ALONG DATA FLOWS

BACKGROUND

In the present day and age, applications often fail at times due to errors which may occur in their execution, due to the way they are coded, user input, or for a variety of other reasons. Debugging techniques are often used by software developers in programs called debuggers to stepwise execute an application to detect and diagnose such errors in the application. In this manner, by using debuggers, developers are able to get insights into the state of an application (e.g. values assigned to variables, status of threads, etc.). Usually, developers are able to set breakpoints, which are used to pause execution of a program at different points, where a developer or engineer wants to analyze the execution and examine the values of these state variables. These breakpoints, in turn, are bound to a given line of source code, wherein a program may be unconditionally stopped at that point every time the program is run, or wherein a condition may be set to stop the program at that line every time such a condition is met (e.g. when a variable exceeds or becomes less than a threshold value, etc.). Then, having stopped at that line, a developer using a debugger may stepwise execute through a block of subsequent lines of code following that line. As the debugger executes code stepwise in this manner, the developer may examine the state of variables of interest. Through examination of the program state at these different breakpoints, and the possible stepwise monitoring of subsequent lines of code, developers and engineers are then able to trace the source of these errors and can monitor data flows throughout these applications as well.

Although this concept of setting breakpoints works well with small non-complex code, if the code is complex, has been coded by multiple developers, or is otherwise split in a non-traceable or difficult to trace manner, it can be tricky to know where to start debugging and/or analyzing the code, and where to follow the code from this start point until it encounters an error. Debugging with breakpoints in this manner requires a starting point, from which a debugger descends stepwise to the next breakpoint, taking into account changes in variables accounting for a change in state of the program, whereby at a certain breakpoint, for example, an undesired change in state program variables may lead to an error being discovered. That is, it might take unnecessarily long to figure out where this starting point is, to figure out how exactly to descend stepwise, breakpoint-to-breakpoint, in order to discover that the program has a bug, and is not performing as expected. For example, if a programmer realizes an output value of a variable is faulty, but it is not obvious which statement of code, out of a plurality statements involving the variable, may have been the path the variable took to have faulty output, then it is difficult to know where exactly a bug in the program exists. Consequently, it is difficult to assign a starting point, or breakpoints following the start point, to determine where exactly to analyze the changing values of the variable to lead to an error-diagnosis. Spending time in determining where to start debugging analysis by placing breakpoints among what may be hundreds or thousands of lines of code is not conducive for quickly diagnosing problems or examining flows of data.

Another problem is that debugging is typically more useful for people like engineers/developers who actually have a working knowledge of the code in question. For people like financial auditors, privacy experts, etc., who may have an interest in monitoring data flows throughout an application but who may not have an intricate dealing with or knowledge of code, although they would like to monitor the flow of data in order to analyze an abnormal output value or if they suspect an error may be occurring, they may have no idea where to set an appropriate starting point or breakpoint to thereby trace the flow of the source of the error stepwise. This is because they may not have a knowledge of the code of the application, and may not be able to interpret the meaning of the code to determine where the variable may be manipulated so as to take a path and achieve a faulty or abnormal value.

In order to monitor variables to determine where they may be manipulated, it may further be possible to set watch points in debuggers. A watch point, often tied to a variable, may stop the program every time a variable is accessed, when a certain condition is met with regards to that variable (e.g. for a variable string a, the program may be stopped every time string a is accessed when string a="bob", or for a variable integer b, the program may be stopped every time b is accessed when b=50, or any other such conditional statement becomes true). It may be difficult for a non-technical person such as a financial auditor or privacy expert, who may not be well-versed in computer syntax, to set individual watch points on specific variables, and thus this may not be an optimal user-friendly option.

Furthermore, even if a watch point is set on a variable, the watch point may be bound to the variable itself and not the content of the variable. In this case, if a second variable is directly derived by being set equal to a first variable with a watch point (e.g in the example above with a watch point on variable b, to see if the condition above where b=50 is satisfied, a variable integer c may be set such that c=b), then the watch point may pause at the line of assignment, when the condition is satisfied. That is, if b=50, the program may pause at the line c=b if a watch point has been set on variable b.

However, if for another variable integer d, if variable integer d is set as equal to variable integer c in the example above (d=c) and a watch point is still set on variable b, even if the value of d may be 50 when b becomes 50, the program would still not stop at the line d=c, because the watch point is tied to the variable. That is, because the watch point is tied to the variable itself and not the content of the variable, in this case, if b were a variable to be monitored and stopped, the stopping may not be propagated to other variables that get the value that is assigned to variable b (i.e. in the above example, though integer d gets value directly from b being assigned to 50, since d=c and c=b, the debugger will not stop at its assignment line d=c because the watch point is only on variable b).

Finally, another problem is that a typical debugger is bound to an application or platform. Often nowadays, with the advent of the internet, cloud computing, and other such technological advances, content tends to be fragmented across applications. System information flows across a platform, especially with applications that are used on the Internet, across networks, web applications, cloud applications, etc. In such applications, a plethora of micro-services may be receiving data from other services or micro-services, and there is a mass cross-flow of data back and forth between different platforms and applications. An error occurring in one micro-service may have its origin in data received from another micro-service, which may in turn have received faulty data from a third application or micro-service, and so on and so forth. Without having a clear way to trace data flow across applications, tracing errors in an application-bound manner may not be able to trace back an error to a different micro-service. As a result, aside from wasting time trying to find an appropriate starting point and appropriate breakpoints, acting in an application-bound manner may in fact misclassify or incorrectly classify errors which are a result of actions not taking place in the application being debugged. Furthermore, end-users of micro-services may want to debug data originating from a different original application or service which may send data to the micro-service that they are using. However, they may not have access to the original application, and thus may not be able to debug the source of abnormal or faulty data across platforms.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for efficient content-driven debugging or monitoring by taint tracking along data flows in applications.

Figure 1:
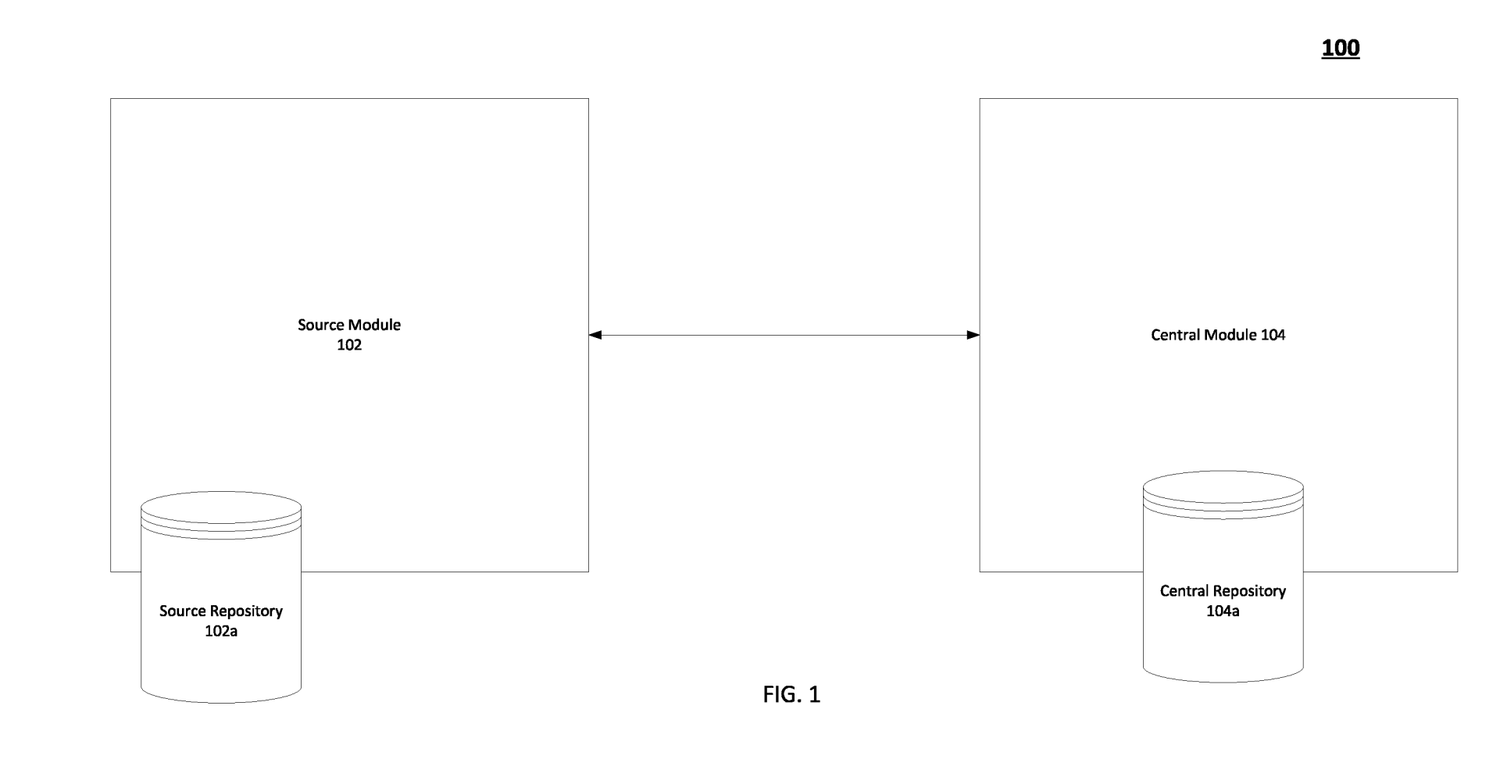
FIG. 1 is a block diagram of the interaction between a source module with a database and a central module, according to some embodiments.
Figure 6:
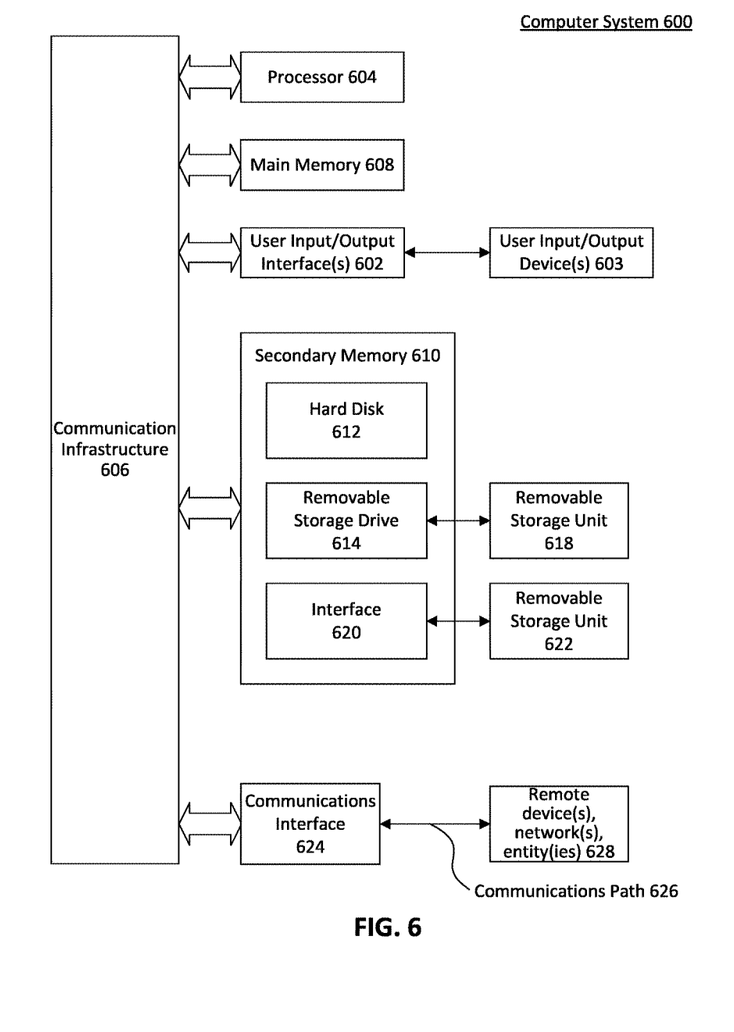
FIG. 6 is an example computer system useful for implementing various embodiments.

FIG. 1 is a block diagram of a data-transfer environment 100 showing the interaction between a source module 102, which may include a source repository 102a, with a central module 104, which may include a central module repository 104a. The user of the source module, using the disclosed embodiments, may be able to input data such as an HTTP request, a data table, SQL command, etc. that is received by the central module 104, and is monitored for being tainted. The central module 104 may conduct this monitoring process wherein the outcome may be displayed on a graphical user interface (GUI) to the source module user. According to an embodiment, the central module 104 and the source module 102 may comprise one or more separate computer systems such as the computer system 600, as shown in FIG. 6 and will be explained later. According to an embodiment, the source module repository 102a may itself comprise one or more separate computer systems such as the computer system 600, or the source module repository 102a may be present on an existing computer system 600 of the source module 102.

To aid in describing the methods of FIG. 2 and FIG. 4 that follow, an example embodiment of the underlying structure will first be described. The underlying structure of a computer system 600, shown in FIG. 6, can implement a taint-tracking mechanism and the sending and receiving of data. Such a computer system, may, according to the embodiments describe above, include source module 102, source module repository 102a, and central module 104. Computer system 600 may include one or more processors (also called central processing units, or CPUs), such as a processor 604. Processor 604 may be connected to a communication infrastructure or bus 606.

Computer system 600 may be virtualized, or it may also include user input/output devices 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process tainted data received from the source module repository 102a when data is to be processed in a mass quantity, making it particularly effective in resource-intensive applications to check to see if the data is tainted or not based on rule-based or Boolean logic. In addition, such a GPU may be used in user operations on the monitoring of taint data throughout the debugging process, such as filtering and monitoring for certain variables, etc. The GPU may have a parallel structure that is efficient for parallel processing of large blocks of data, such as mathematically intensive data common to computer graphics applications, images, videos, word-processing documents, PDF files, and the like, any of which can include table data received from source module repository 101a as described above. In addition, the register table of the GPU may be used to store a taint map for variables that may be designated as tainted in processes monitored, taking advantage of the much larger register file that the GPU has as compared to CPUs. Using fast access registers to maintain the taint map of frequently accessed data can improve dynamic tainting performance, wherein memory locations corresponding to potentially tainted variables and pointers from these locations may be stored, pointing to either a tainted data structure or a null data structure in the map.

Computer system 600 can also include a main or primary memory 608, such as random access memory (RAM). Main memory 608 can include one or more levels of cache (including secondary cache), which may be used for caching operations for the hierarchy, as will be described later.

Computer system 600 can also include one or more secondary storage devices or memory 610. Secondary memory 610 may include, for example, a hard disk drive 612 and/or a removable storage device or drive 614, which may interact with a Raid array 616, which may combine multiple physical hard disk drive components (such as SSD or SATA-based disk drives) into one or more logical units, or a removable storage unit 618. Removable storage unit 618 may include a computer usable or readable storage device having stored thereon computer software (control logic) and/or data, including remotely accessed network drives. Removable storage unit 618 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote entities 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable output data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), Structured Query Language (SQL), or any other functionally similar representations alone or in combination, and may be used for sending or receiving data (e.g. between any of the source module 102, the source repository 102a, the central module 102, and the central repository 104a in FIG. 1). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Computer system 600 may be a client or server, accessing or hosting any applications and/or data through any delivery paradigm, including but not limited to remote or distributed cloud computing solutions such as cloud computing environment 501 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the source module repository 102a, or central module repository 104a, as an example approach, for storing and accessing its constituent data objects, the computer system 600 may use an in-memory database with persistence, which may store and access data objects from the primary memory 608 of the computer system 600 with a transaction log for persistence being stored in secondary memory 610. For the repository 102a, the computer system 600 may implement only part of the data as an in-memory database, using less primary memory 608 than as described above, to reduce the in-memory footprint, and may instead store a larger portion of the data as a disk-based database within the secondary memory 610, where the data may thus be stored in a tiered manner (more frequently accessed data may be stored in primary memory 608 while less frequently accessed data may be stored in secondary memory 610, for example).

Alternately, the computer system may store none of the data in primary memory 608 or secondary memory 610, and the computer system 600 may write data to a separate file archive stored in the secondary memory (e.g., in a file on a hard drive in a Raid array 616, on an EPROM chip 620, or other type of secondary memory 610, etc).

Further, if the source module repository 102a is implemented as a separate system 600, it may send data through the communication or network interface 624, wherein the source module 102 and central module 104 may comprise entities 628 present on an internal or external network, which may be accessed through communications path 626. Alternately, if the source module 102 is present along with source module repository 102a jointly in a computer system 600, the computer system 600 may implement the database using the communication infrastructure 606 for communication between the source module repository 102a and the source module 102, but may send data to the central module 104 through the communications interface 624, through communications path 626, where central module 104 is a network entity 628. Similar sending of data may occur in an analogous manner with regards to the central module repository 104a, and the central module 104, depending on whether central module repository 104a is implemented as a separate system 600.

Figure 5:
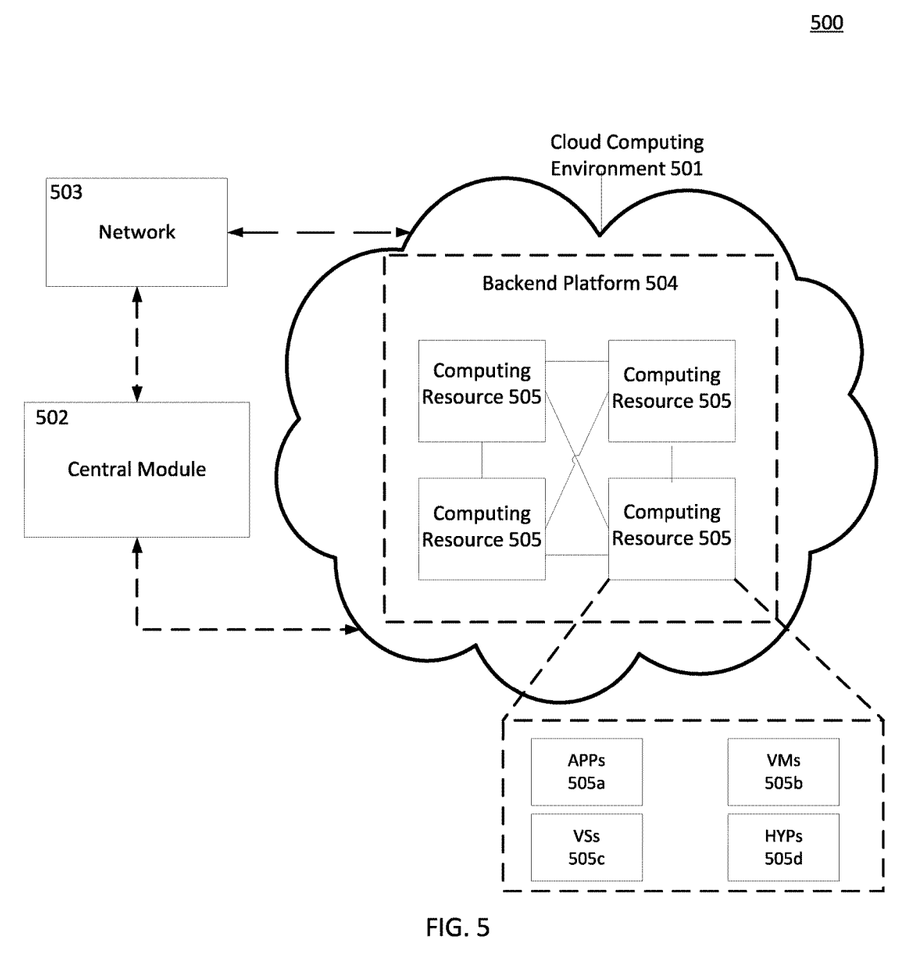
FIG. 5 is a block diagram of an example where a cloud computing environment may be accessed by a source module, according to some embodiments.

As shown in FIG. 5, cloud computing environment 501 may contain backend platform 504, in a block diagram of an example environment 500 in which systems and/or methods described herein may be implemented. The central module 104 of FIG. 1, described above, may also include a host such as cloud computing environment 501. The cloud computing environment 501 may be accessed by the central module computing system 502, of the same type of computing system 600 as described above. In this case, the central module computing system 502 of FIG. 5 may access the cloud computing environment 501 by a communication or network interface 524 as shown in FIG. 5, wherein a network gateway 503 may comprise a remote entity 628 accessed by the communications path 626 of the central module computing system (where the three entities 501, 502, and 503 shown in FIG. 5 would collectively correspond to the central module 102 of FIG. 1). Alternately, the computing cloud environment 501 itself may correspond to a remote entity 628 in FIG. 6, and may be accessed directly by the central module computing system 502 through a communications path 626, for example through an application protocol interface (API), eliminating the need for a network gateway 503 (both options are shown in FIG. 5, wherein the flow path above the central module computing system 502 uses a network gateway 503, and the flow path below the central module computing system 502 connects directly to the cloud computing environment 501, both shown using dashed bi-directional lines).

The devices of the environments 600 and 100 may be connected through wired connections, wireless connections, or a combination of wired and wireless connections.

In an example embodiment, one or more portions of the data transfer environment 100 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the central module 104 of FIG. 1 may have a central module computing system 502 as shown in FIG. 5 comprising a computer system of the same type as the computer system 600 as shown in FIG. 6. The source module 102 or source module repository 102a may access the central module 104 through the central module computing system 502, wherein the source module 102 or source module repository 102a may be external network entities 628 from the perspective of the central module computing system 502 in an embodiment, and may send data back and forth in the form of data packets through the communications path 626 of the communications interface 624 of system 502, using e.g., TCP/UDP/FTP/HTTPS/HTTP protocol. Alternately, the source module may access the central module 104 through a front-end web-application application 505a (e.g. a web browser application, a web browser extension, proprietary OS application, standalone executable application, command line access shell program, FTP/UDP/TCP/HTTPS/HTTP protocol, etc.) hosted as an application 505a on a computing resource 505 (explained infra) within the cloud computing environment 501 hosted by the central module 104, in an embodiment. Such an application may comprise a software as a service (SaaS) type offering, as described above.

The backend platform 504 in FIG. 5 may include a server or a group of servers. In an embodiment, the backend platform 504 may host a cloud computing environment 501. It may be appreciated that the backend platform 504 may not be cloud-based, or may be partially cloud-based.

The cloud computing environment 501 includes an environment that delivers computing as a service ("CaaS" as described above), whereby shared resources, services, etc. may be provided to the central module computing system 502 and/or the backend platform 504. The cloud computing environment 501 may provide computation, software, data access, storage, and/or other services that do not require end-user knowledge of a physical location and configuration of a system and/or a device that delivers the services. For example, the central module computing system 502, as well as source module 102, may receive data stored within or hosted on a database within computing resources 505 within the backend platform 504, through an application protocol interface (API) or any of the various communication protocols previously listed. The cloud computing environment 501 may include computing resources 505.

Each computing resource 505 includes one or more personal computers, workstations, computers, server devices, or other types of computation and/or communication devices of the type such as computer system 600 described above. The computing resource(s) 505 may host the backend platform 504. The cloud computing resources may include compute instances executing in the cloud computing resources 505. The cloud computing resources 505 may communicate with other cloud computing resources 505 via wired connections, wireless connections, or a combination of wired or wireless connections.

Computing resources 505 may include a group of cloud resources, such as one or more applications ("APPs") 505a, one or more virtual machines ("VMs") 505b, virtualized storage ("VS") 505c, and one or more hypervisors ("HYPs") 505d.

An application 505a may include one or more software applications that may be provided to or accessed by a computer system 600. In an embodiment, the central module 104 may only include a cloud computing environment 501 executing locally on a computer system 600 of the central module computing system 502. The application 505a may include software associated with backend platform 504 and/or any other software configured to be provided across the cloud computing environment 501 (e.g. to source module 102). The application 505a may send/receive information from one or more other applications 505a, via one or more of the virtual machines 505b. Computing resources 505 may be able to access each other's applications 505a through virtual machines 505b, in this manner. In an alternate embodiment, a separate central module computing system 502 is not needed, and the central module 104 only comprises the cloud computing environment 501, hosted and executed by computing resources 505, and communicating with the source module 102 via app 505a, using any of the various communication protocols mentioned above.

Virtual machine 505b may include a software implementation of a machine (e.g., a computer) that executes programs like a physical machine. This may be of particular use in the alternate embodiment where there is no separate central module computing system 502 of the type of computer system 600. In this embodiment, the central module computing system 502 may be a virtualized machine 505b, and may communicate with source module 101 using the various communication protocols listed above, via an application 505a. Virtual machine 505b may be either a system virtual machine or a process virtual machine. A system virtual machine may provide a complete system platform that supports execution of a complete operating system (OS). A process virtual machine may execute a single program and may support a single process. The virtual machine 505b may execute on behalf of a user (e.g., the administrator of the central module 104) and/or on behalf of one or more other backend platforms 504, and may manage infrastructure of cloud computing environment 501, such as data management, synchronization, or long duration data transfers, and accessing the source module repository 101a of a source module 101.

Virtualized storage 505c may include one or more storage systems and/or one or more devices that use virtualization techniques within the storage systems or devices of computing resource 505. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the central module 104 flexibility in how they manage storage for evaluation data for debugging from processing of data accessed from the source module repository 102a (as will be explained infra). File virtualization may eliminate dependencies between data accessed at a file level and location where files are physically stored. This manner of block and file virtualization may enable optimization of storage use, server consolidation, and/or performance of non-disruptive file migrations, especially for transmitting data of tainted data memory locations across applications.

Hypervisor 505d may provide hardware virtualization techniques that allow multiple operations systems (e.g., "guest operating systems") to execute concurrently on a host computer, such as computing resource 505, which may include a computing system of the type of computing system 600, and can in this manner host a virtualized hardware of a central module computing system 502. Hypervisor 505d may present a virtual operating platform to the guest operating systems, and may manage multiple instances of a variety of operating systems as these "guest operating systems," which may share virtualized hardware resource, such as RAM, which may for instance access the data in the form of a database of the source module repository (102a in FIG. 1). Alternately, secondary memory may be accessed using virtualized storage 505c, or on physical storage, such as the hard disk drive 612, of a computing resource 505 of the type of computing system as computing system 600. In embodiments heretofore described, using a combination of RAM and secondary memory to access the database, such that a portion of the database may be in-memory and a portion of the database stored in files, is also envisioned, wherein source module 102 may also include an environment 500 with a cloud computing environment 501, instead of only a computing system of the type of computing system 600.

Figure 2:
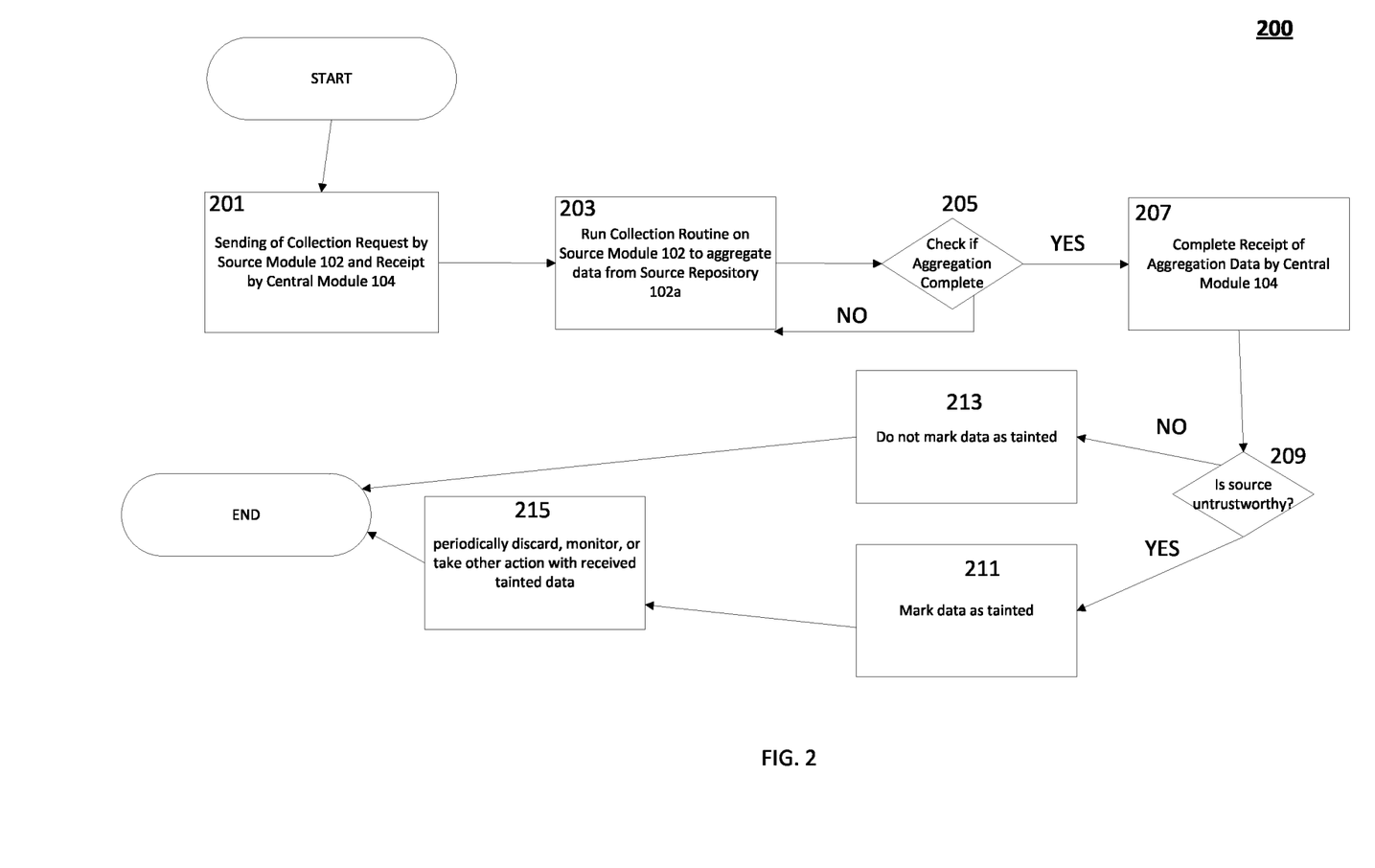
FIG. 2 is a flowchart illustrating a process for an embodiment of taint-tracking data to be received by a central module, where a source module non-administrator user is inputting data.
Figure 4:
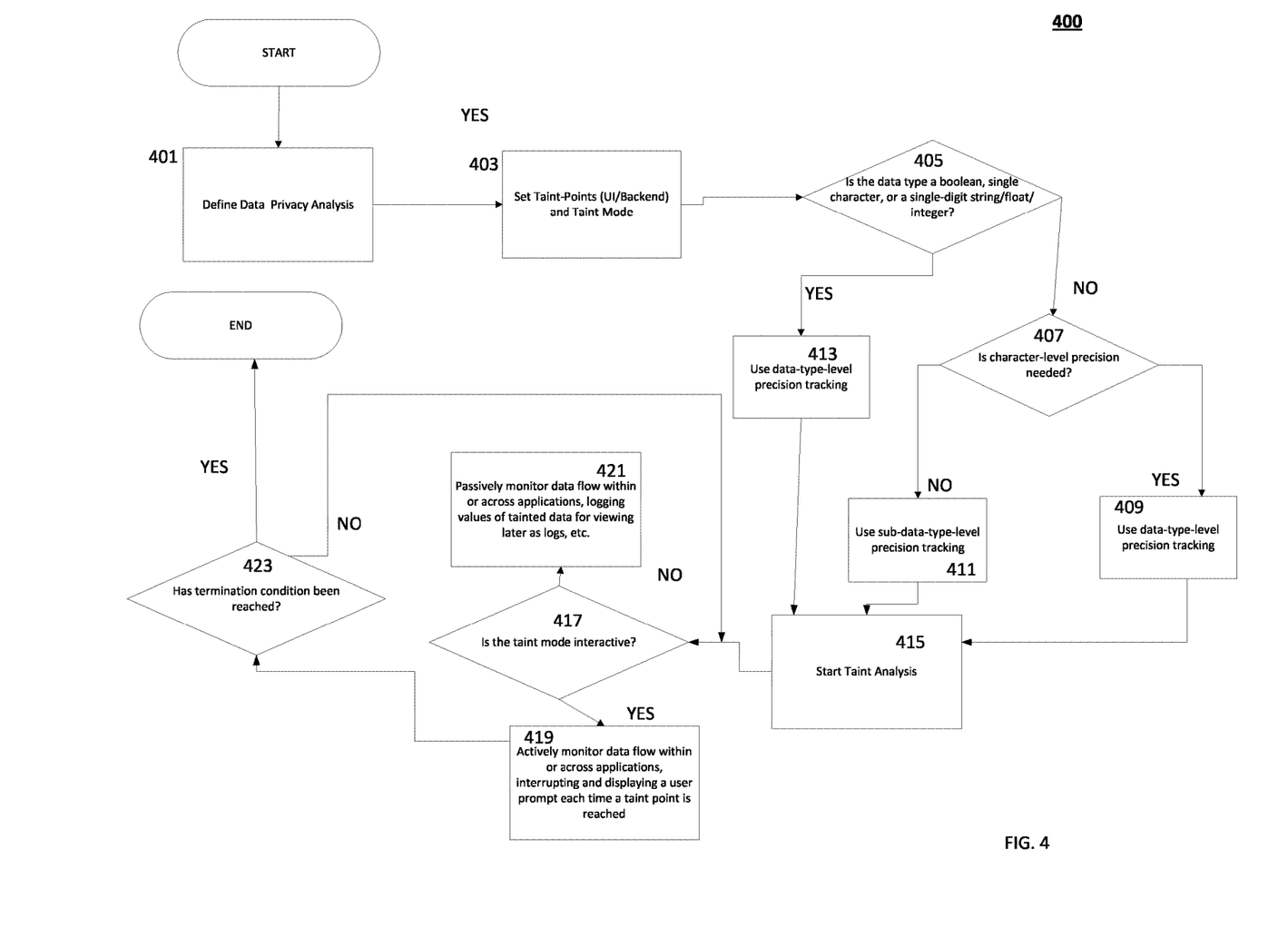
FIG. 4 is a flowchart illustrating a process for an embodiment of taint-tracking where a source module administrator user is monitoring data inputted by other users to a central module.

FIGS. 2 and 4 are flowcharts describing flows of embodiments of an application for monitoring tainted data of a process executed on the central module 104 from data gathered from a user at source module 102. Both method 200 and 400 can each be performed by processing logic that can include hardware (e.g., circuitry, dedicated logic, programmable logic, microcode, etc.), virtualized hardware, software (e.g., instructions executing on a processing device), virtualized software, or a combination thereof as described above. It is to be appreciated that not all steps may be needed to perform the disclosure provided herein. Further, some of the steps may be performed simultaneously, or in a different order than shown in FIGS. 2 and 4, as will be understood by a person of ordinary skill in the art.

Method 200 shall be described with reference to FIGS. 1, 3A, 3B, and 5-6, although method 200 is not limited to these embodiments. Although the steps of the method 200 are herein described such that the source module repository 102a of FIG. 1 is considered to be a part of the computing system 600 of FIG. 6 comprising the source module 102, the method may also be carried out analogously in the case that the source module repository 102a of FIG. 1 itself includes a separate computing system 600 of FIG. 6. In this case, communication between the central module 104 and source module 102 described in relevant steps of the method 200 would require further network communication between the source module 102 and source module repository 102a, such as by using communications path 626 of FIG. 6, as described above. The same reasoning applies to the method disclosed in FIG. 4, if the central module repository 104a of FIG. 1 itself includes a separate computing system 600 of FIG. 6.

The embodiment of FIG. 2 may be an embodiment wherein a source module user of a source module 102 submits data or inputs a variable to a process to be run on the central module 104, where the source module 102 user is a non-administrator. In this embodiment, a separate administrator or developer may have previously set rules for taintpoints. Taintpoints may comprise a combination of rule-based or machine-learning logic set by an administrator of a process running on a central module 104, for indicating when data may be tainted.

Figure 3A:
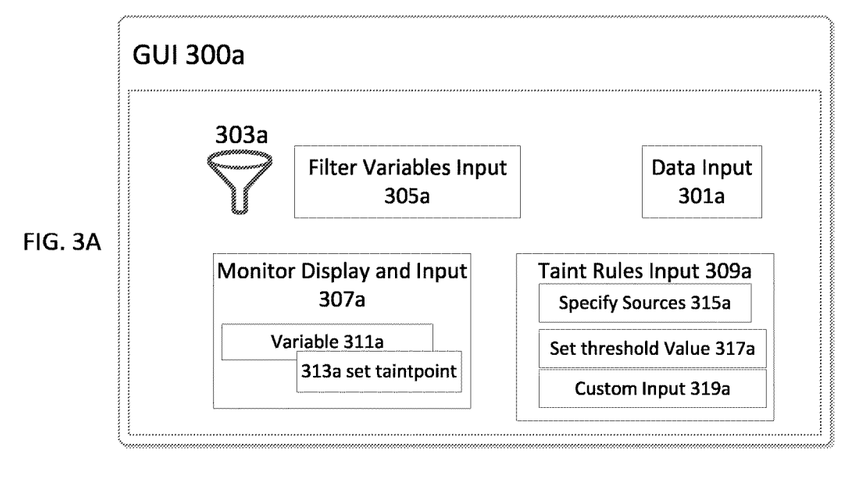
FIG. 3A is a graphical user interface (GUI) showing the display interface on a source module generated from a central module, and accessed by the source module, before the starting of the taint analysis process, for setting monitoring/debugging parameters for monitoring/debugging data received by the central module in an application, according to an embodiment.

A user of the source module 102 may see a GUI as shown in FIG. 3A. This GUI may be part of e.g. a cloud application 505a generated from the central module 104, and displayed on a webpage of a source module 102, a standalone application on the source module 102, etc. Since the source module 102 user is not given administrator privileges, the taint rules input section 309a may be greyed out. In the data input 301a box, the user may input a file, a database command (e.g. an SQL select command to select data from a database), an HTTP request, a variable in a text box (float, int, char, string, table etc.), or a command using any of the protocols described above (e.g., an SQL create command). This form of input may also select a database file or part of a database from the source module repository 102a. Then, when selected, the user may click on the box 301a to submit the data input. In step 201, this action would then send a collection request by the source module 102 to the central module 104.

The central module 104 may then run a collection routine (in step 203) on the source module 102 to aggregate data from the source selected in step 201. In FIG. 2, an example where the data source might be the source repository 102a is shown, wherein the collection routine would aggregate data from the source repository 102a. However, as described above, the source may not only be a database in the source repository 102a, but also may be a file on the file system, in primary memory 608 or secondary memory 610 of the computer system 600 of the source module 102. The source may also be a remote web source from which a portion of a database may be selected (e.g. using an SQL create or SQL select command, or any of the other protocols mentioned above), or any other linked source. Finally the source may be a table that is inputted by the user of the source module 102 itself into data input 301a, in the form of typing a variable in a data field, or even typing an entire table into a data field.

In any of these cases, before the collection subroutine is run by the central module 104, the central module 104 may record the source of the data that has been inputted (whether it was typed by the user, whether it was inputted from a database in the source repository 102a, whether it was accessed from a remote webpage with a particular URL or FTP address, etc.). This may be important, in an embodiment, as one criteria for marking taintpoints may be the trustworthiness of input based on its origin/providence.

Then in step 205, the process of FIG. 2 may checked at regular intervals (e.g. 1-1000 ms) to see if the data aggregation has been completed. If it has not been completed ("NO" at step 205), no action takes places and the process waits for the collection routine to finish at step 203. If the aggregation has been completed, the process moves to the next step of completing receipt of the aggregation data by central module 104 at step 207.

In completing reception of the data, at step 209, the process assesses the source previously recorded at step 203, to check if it is trustworthy. Taint rules 309*a* may have been previously set by an administrator of the process running on the central module 104, where such rules may include a list of sources which are trustworthy, where all other sources are to be considered untrustworthy, and marked as tainted. Alternately, such rules may explicitly include a list of sources which are marked as untrustworthy, wherein only those sources which correspond with sources on the list should be marked as tainted. This may be particularly useful, for example, for monitoring data which may have arrived from previously known malicious or unsafe applications/webpages, etc. Based on such rules, if the source recorded at 203 is not untrustworthy ("NO" at step 209), then the data received is not marked as tainted in 213, and no further action takes place.

However, if the source recorded at 203 is untrustworthy ("YES" at step 209), then the data is marked as tainted in 211. The data may be marked as tainted in a number of ways. For example, for a variable to be marked as tainted, a pointer (which may comprise, e.g., 4 bytes in a 32-bit system) may be added in shadow memory, mapped to the memory location of the variable, and pointing to a tainted data structure (which may be as less as 1 bit of taint information, or may comprise a boolean, char, int, or other structure). On the other hand for data which is not tainted, instead of step 209 as described above (no further action takes place), in an embodiment, a null pointer may be stored. These pointers, as described above, may be stored in primary or secondary memory 608/610 accessed by a CPU or a GPU of the central module 104.

For example, a register file of the GPU may be used to store part of the taint map incorporating the shadow memory described above. Furthermore, memory locations of the content of the tables/variables that have been input as data may be written and marked as tainted in a database which is implemented in primary memory 608 and/or secondary memory 610, and in this manner may be written to a database stored in the central module repository 104*a*. These various methods of marking the data as tainted may be able to track the data in a cross-application, cross-platform manner, even as it may be reassigned among variables and used in various functions, where taint-aware platforms and applications may seek to look in shadow memory locations for pointers to tainted data structures or interpret stored database information (e.g. in the central module repository 104*a*) for finding memory locations of tainted data and marking such data as tainted. Subsequently, when the value of a variable may be copied across platforms (e.g. from one computer system 600 to another, virtualized system 505*b* to another virtualized system 505*b*, etc.), a taint-aware variable transfer may also copy over the tainted data structure in shadow memory from one computer system 600 or virtualized system 505*b* to another computer system 600 or virtualized system 505*b*.

In this manner, there may be a plurality of source and central modules 102 and 104, and data arriving to a current central module 104 that has been tainted previously may maintain its tainted nature as it is received by the current central module 104, where the stored data in shadow memory from a previous tainting is implicitly passed along with the data when inputted by a user in the data input field 301*a* when a user references, e.g., a table, database, or variable from a particular remote source or from the source module repository 102*a*.

That is, the protocol of the taint-aware process of the current central module 104 would know to look for pointers adjacent to the memory locations of variables, arrays, tables, etc. passed as data, in shadow memory (where as described above, there may be a null pointer when data is not tainted and a pointed pointing to a tainted data structure when data is tainted, where each such data element inputted may have an associated shadow memory pointer). The tainted nature may also be passed in the form of a shadow database table from a previous central module repository 104*a* to a current central module 104 which recognizes and interprets the table to see which memory locations of data passed were tainted, and marks them as tainted accordingly.

Once data has been marked as tainted by the central module 104 in the above process, per rules given by the administrator in 309*a*, certain actions may be taken with this tainted data. For example, at step 215, the central module 104 may periodically monitor for tainted data (e.g. 1-1000 milliseconds) during the running of its process. Depending on the goal of the administrator, the actions taken for the tainted data may be different.

For example, for preventing the flowing of tainted information into a security sensitive area, the central module 104 may act as a buffer system to check whether information coming from a given source may be allowed to proceed further. If the source is marked as untrustworthy and the data is not allowed to proceed further, it may be deleted or discarded.

On the other hand, if the data is inputted from an internal database on an intranet (source module 102 is on an intranet with central module 104) which must be prevented from being leaked, it may also be tainted for that reason instead (the rules at step 207 would be modified to monitor for data coming from this particular source, and tainted if so). In that case, tainted data may be allowed to proceed to a security sensitive area, but may be monitored further to not be leaked from the intranet.

Finally, it is possible, if a source is not recognized one way or the other (following the example rules in step 207 above where if a source is not part of a list of recognized sources, data from such a source is marked as tainted), further analysis may be carried out, e.g., to prevent user manipulation of input to carry out an attack. One such attack may be an injection attack, where instead of a numerical or string form of input the user may input partial code, which when inputted targets an exploit on the central module 104. Thus, the user input (e.g. if a string is expected as input from data input 301*a*) may be monitored for traces of code-based syntax (e.g. JAVA syntax, PERL syntax, SQL syntax, and the like), and if such code-based syntax is detected, such a tainted string may be discarded as the analysis performed in step 215. This can help monitor for and prevent code-based attacks such as SQL injection attacks, buffer-overflow attacks, and other such attacks.

Aside from preventing attacks from the user however, tainting information may also be used by the administrator for the opposite reason as well, to help the user in assessing a process or the like. For example, if the user would like to keep track of the values of a variable as it undergoes a looping process which is not visible to the user in central module 104, such a variable may be marked as tainted information by the administrator of the process per rules 309a, and in a logging mode for dealing with tainted information, at step 215, values of the tainted value throughout the looping process may be displayed back to the user of the source module 102 on the GUI 300a in the Monitor Display and Input area 307a. A large plurality of variables may be displayed in this manner, and the user may filter them by typing in a desired variable to be filtered in the filter variables input 305a box, and clicking the filter 303a button. This action would then show results of a desired variable throughout the process of central module 104, as it is run, to the user of the source module, in Monitor Display and Input 307a.

The process of FIG. 4 will now be described. In contrast to the process shown in FIG. 2, which is more catered to a user that is not an administrator of the source module 102, FIG. 4 describes an embodiment where a user of the source module 102 may be someone with administrator-level privileges with regards to a process occurring in central module 104. It is important to note, when a process occurs in a central module 104, because the central module 104 may comprise an entire cloud network 501, the central module 104 actually may include a plurality of computers 505 or applications 505a which are delivered across the internet and to other computing systems 600, and thus a process occurring in the central module 104 may in fact also include the process further interacting back and forth with external computers 600 that are part of the Internet, or another external network. This also applies to the embodiments described above.

In step 401 of the process shown in FIG. 4, the goal of the administrator is first defined. For example, one use of monitoring data flows across applications is to ensure privacy is maintained to conform with legal requirements, etc. Thus in this case, a privacy expert who is auditing a process may hold administrator level privileges to check and monitor the flow of user data across applications from the process of the central module 104.

Thus, the user may first define the types of data they are looking for in 401. In particular, to be more user-friendly, for those users (such as privacy data experts) that may not familiar with computer-based coding syntax, a layman variable selection of process variables may appear in the Monitor Display and Input 307a, where data types ("strings," "numbers," "tables," etc.) of variables used in a process of central module 104, which are to be examined by the administrator user, may first be displayed. At step 401 then, the privacy data expert, or other administrator user in FIG. 4, may select the category of variable they are interested in (multiple categories may be selected, such as strings, numbers, tables etc.).

Then at step 403, all such variables in the categories that have been selected by the administrator user (e.g. strings, numbers, tables, etc.) that are used in the process may be displayed in the Monitor Display and Input 307a, along with a brief description of what role they serve in the process, in lay terms (for example "pc" may be a string variable used in the process of central module 104 which indicates user postal code, and both the variable and a lay description indicating that it stores the postal code would be displayed in 307a). From this narrowed variable display, there still may be a plurality of variables displayed in the Monitor Display and Input 307a (for example, there may be several hundred strings, numbers, or tables being used in the process of central module 104, respectively). In the same manner as described with respect to FIG. 2 above, the filter variables input 305a box may be able to be used by the administrator user to further narrow display of variables in the Monitor Display and Input 307a.

Then, still at step 403, the administrator user may define certain taintpoints and how they are to be assessed. In the display of the variables used in the process that may be displayed in the Monitor Display and Input 307a, after any filtering process run by the user by clicking on 303a, etc., variables in the categories (e.g. strings, numbers, tables, etc.) that have been selected by the administrator user, and their accompanying lay description, may be displayed in the variable 311a area as shown in FIG. 3A. Here, the administrator user may easily (e.g. by right-clicking or doing a mouse-over action) open a prompt to set a taintpoint shown in the set taintpoint 313a area. Thus, a non-computer expert may then set a taintpoint on a variable of choice with ease. First, they can choose a category which they are interested in. Second, by reading the lay description of the variables displayed in 307a in the variable 311a area, they may be able to filter several of the variables using the filter variables input area 305a and button 303a as described above.

For example, if 50 variables begin with certain letters, as the user starts typing in such a word (e.g. "car") in the filter variables input area 305a, the variables may be dynamically updated in the monitor display and input 307a area to only display variables that begin with the letters that the user has inputted (e.g. "car1", "car2", "carburetor", etc.). Then, third, once filtered variables chosen by the user are displayed in the Monitor Display and Input 307a area, by simply right clicking and selecting the set taintpoint 313a option on any of these filtered variables, a taintpoint may be set on the respective variable.

Further, once taintpoints are set, the administrator user may define how certain taintpoints are to be assessed, wherein certain conditions may trigger the taintpoint, etc. This may be conducted in taint rules input 309, where this field may have several buttons such as specify sources 315a, set threshold value 317a, etc., that can be used to build rule-based queries for lay administrators. For example, if the privacy data expert wanted to mark postal codes input from certain sources as tainted, he or she may be able to select the variable in the monitor display and input 307a through the right-clicking or mouse-over process described above, and then he or she may select rules based buttons in field 309 such as a specify sources button as shown in 315a, to thereby specify sources from which these codes may be marked as tainted. Then, when the process of central module 104 is run, and other non-administrator users of source modules 102, as described in FIG. 2 above, input data to the process of central module 104 (or where the administrator-user in FIG. 4 may input his own data in step 415 described below), based on the taintpoint rules set by the administrator-user of the source module 102 in FIG. 4, data may be marked as tainted.

The administrator may also define the taint mode. For the taint mode there may be a passive mode and an active mode. The passive mode is for logging taint data or performing autonomous actions with data marked as tainted. On the other hand the active mode is used for active debugging or monitoring data flow, and state variables across applications, each time a taint point is reached. The passive or active mode may be chosen, e.g., by a radio button next to each option displayed in the Monitor Display and Input area 307a of the GUI 300a. The taintpoint rules may be set from the UI or the backend. As explained above, lay administrator users who are not familiar with computer syntax taint points, such as privacy experts, may set taintpoint rules solely from the UI using buttons to aid them in constructing rules-based queries. Developer/security engineer administrator users can also set taint points through complex rules-based syntax, code, or machine-learning logic of their own that they may simply input as, e.g., text or a file, into Taint Rules Input 309a, such as through a custom input 319a field which can receive text or a file as input.

Further, the analysis of the inputs themselves into the central module 104 for tainting may occur on a full-variable or character-by-character basis. At step 405, in defining a taint-point for a particular input, out of a plurality of inputs, the process checks whether the data type of the input is a Boolean, single character, or single-digit string, float, or integer. In either of these cases ("YES" at step 405), the data is only one character or digit long, and can therefore in step 413 be analyzed on a data-type-level. At the data type level, the taint analysis focuses on whether the one digit or character is tainted or not.

If, on the other hand, the data type is not one of these cases ("NO" at step 405), this means the data type might be a multiple digit string, float, integer, etc. In this case, the user then needs to decide at step 407 whether character-level precision is needed. This level of precision may not be needed (in step 411) in applications where one constituent part is enough to taint a whole. In these cases, e.g. for a string, when at least one character in the string originates from a tainted source (because then the entire string should be marked as tainted), then the entire string is marked as tainted, and character-level information is not tracked. In essence, a characteristic which may be true of a constituent part of the data-type can define the data-type.

On the other hand, character level precision may be needed (in step 409) when different characters of a string are not tainted, and these specific characters may be operated on in a character-by-character manner, wherein ascribing taint to them as a whole (as in the embodiment above) would possibly corrupt their use. For example, if select characters of a string are not tainted, and others are, these characters in particular may be concatenated out of a string later, meaning that none of the data in the concatenation may be tainted. In such a case, performing step 411 (because even the presence of one tainted character would denote an entire string as tainted) may produce an incorrect result. Thus, depending on the application, and the process of central module 104, an administrator user of the source module 102 can define taint-points and taint rules at a character-level precision or a data-type-level precision accordingly.

Furthermore, through taint rules input 309a, as described, rules-based syntax including Boolean logic and machine learning may be used, wherein rules for different inputs may be combined to make composite rules, etc. This may be in a lay manner or a custom-input manner, as also described above. For example, for a lay administrator-user a variable such as temperature may be set as tainted for debugging only upon crossing or going below a certain threshold, which may be set using the set threshold value 317a button. Upon clicking such a button, a lay administrator-user may undergo a series of prompts asking for the threshold value, whether a ceiling or floor should be specified, whether the user would like to specify a threshold range, etc., and may translate the user's choices into a syntax based statement which is automatically implemented by the program upon execution for designation of temperature data as tainted, for debugging.

For non-lay user administrators, as described above, rules-based syntax, conditional statements, Boolean logic, and machine learning rules may be input into the custom input 319a field. For machine learning, different classifiers could be used with associated inputs, and having different weights, such as a feed-forward neural network with one input layer, one hidden layer and one output layer. Back propagation could be used with a training set of this network to correct the weight amounts. Thus, such a classifier could classify several inputs as a group as being reliable, or not reliable (where the output layer may have two nodes, one representing the inputs being reliable and one representing them as being unreliable, and based on the weights and feedforward propagation the node with the larger value would be chosen), and thus define a rule for choosing a taintpoint (when the unreliable node may have a greater value than the reliable node in the output layer).

Other machine learning classifiers such as K-nearest-neighbors, support vector machines, etc., can be used for assessing whether data from inputs should be tainted or not. The benefit of using such machine-learning based classifiers for tainting may be that data changes as it flows over time, and based on associating factors of input, may become unreliable at certain junctures as it flows across applications. With a robust tainting tracking system such as that of the current embodiments, such unreliability can be detected through such classifiers, and can be promptly marked as tainted, and monitored or acted on accordingly.

Next, at step 415, taint analysis may be performed. As described above with respect to FIG. 2, other non-administrator users may input data to be used in the process of central module 104, where the rules that have been input 309a by the administrator may be used to assess taintpoints triggered by the inputs from non-administrator users in said process. Additionally, as described, the administrator user may enter their own data, in a manner similar to that as described for data input into field 301a with respect to FIG. 2, to subsequently monitor the flow of their own data across the process of central module 104 and any other applications it may flow to from there.

After such data is inputted in either case, the process proceeds to step 417 for conducting the taint analysis, where there are two forms of monitoring, which depend on the taint mode as described above and chosen in step 403. A passive form of monitoring ("NO" at step 417), may be preferable for those administrators who do not have to take immediate action on their tainted data, or may take autonomous action on the data for which they do not need to inform any user. In this case, the process proceeds to step 421, where data may be monitored for being tainted in the process of central module 104, as it is reassigned across different variables, and crosses applications where it may leave central module 104, go to another application as an input, and then return as an output to central module 104 in the same process. In this case, there is a marker indicating that the data is tainted in the shadow memory of the data type as stored in primary/secondary memory 608/610 of each system 600 which has an application which the data encounters, and thus the tainting of the variable is tracked in a cross-application and cross-platform manner.

Alternately, as described above, with an appropriate description in the central module repository 104a, a table from this repository 104a may be passed back and forth between taint-aware applications for keeping track of memory locations and data which are tainted. Monitoring may take place at regular or periodic intervals of time (e.g. 0-1000 ms), and appropriate action such as logging the tainted data, deleting the tainted data, or displaying the tainted data to the administrator user in monitor display and input 307a may be taken.

Alternately, at step 417, based on the taint mode chosen at step 403, an interactive mode of taint analysis may be chosen ("YES" at step 417), and the process may proceed to step 419. This mode may be preferable for those administrators who wish to debug stepwise or actively monitor data flow within the process of the central module 104, and as data leaves and goes to other taint-aware applications from the central module 104 and possibly comes back to the process of central module 104. One area this may be applied is data privacy and confidentiality.

As stated, an administrator privacy specialist can input his or her own data which they want to observe in field 301a, based on given rules 309a for tainting. Such data can be part of applicable data protection law or confidential in any other way. Then, during processing, the data may be tainted as per the rules, and will flow through the application.

During debugging, a taintpoint may be triggered at any time the tainted data is read or written (only one may be monitored for tracking a bug down faster). As described above, when any of the rules defined in 309a are tripped (machine learning output layer, thresholds, or other user-defined conditions above coming true) then the data may be marked as tainted. Then, per step 417, whenever the tainted data is read or written, or at timepoints defined by further rules as defined in 309a (which may include Boolean or machine-learning logic), a taintpoint may be triggered, where monitoring for triggered taintpoints may take place at regular intervals (e.g. 0-1000 ms). At such a point, the GUI 300b shown in FIG. 3b may be shown to the user, where a message displaying "Taint Point Has Been Detected/Accessed by User X!" 303b may be shown to the administrator, where the name of the user who has accessed the tainted data may be shown as the "User X." This is noteworthy because, if the administrator knows that a certain user is trustworthy, he may ignore such a warning by simply pressing the ignore 307b button, and the process would continue. In order to automatically ignoring all such future warnings, the administrator may check the remember my choice checkbox 309b.

Additionally, rules may be made in conformance with, e.g., privacy legislation which may require that data may only be processed for a particular purpose. For example, within a program itself, one module which is run for a particular purpose may be granted access to data, and this data might be off-limits to other modules within the program itself. These modules may be called internal-users, as compared to external users (actual people) which have been described above. Per legislation such as GDPR, or other privacy rights legislations in multiple other jurisdictions, for example, it might be against the law to process personal data for a purpose which is not defined. Thus, monitoring in this manner for internal-users may also take place.

Figure 3B:
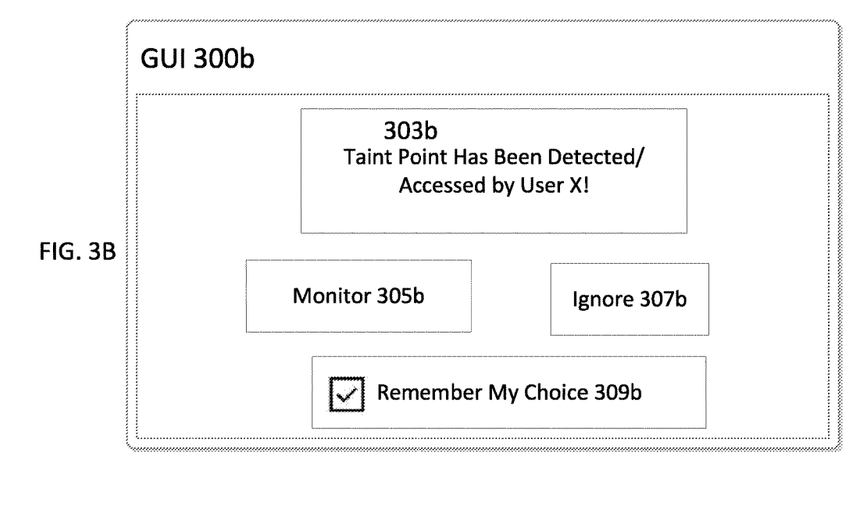
FIG. 3B is a display prompt displayed during the taint analysis processes when a taint point has been detected or accessed by a user, according to an embodiment.

That is, when a taintpoint may be triggered, the GUI 300b shown in FIG. 3b may be shown to the user, where a message displaying "Taint Point Has Been Detected/Accessed by Internal User X!" wherein the name of module, function, sub-class, or other modular structure within the program itself that is accessing the tainted variable or data may be displayed as an internal user. Alternatively, the area 303b may only be reserved for external users, but a popup as shown in FIG. 3B may still be displayed every time the tainted data is accessed by an internal user as well, and by clicking on the monitor 305b button, the administrator-user may be able to see the modular structure accessing the tainted data in the Monitor Display and Input 307a area.

At a minimum, in an embodiment, there may be a prompt displayed every time an internal user modular structure accesses the tainted data, and an area may be reserved for displaying the internal user accessing said data, either in area 303b of GUI 300b, Monitor Display and Input area 307a of GUI 300a, or any other part of either GUI. In this manner, by being able to monitor internal user modular structures of tainted data, a lay administrator user such as a privacy expert or auditor, with little knowledge of computer syntax, could ensure that performance conforms to strictly defined access rules.

In addition to the above, if the administrator user would like to monitor the state of the variables of the process in central module 104 at the taintpoint, then he/she can click on the monitor 305b button, wherein the monitor display and input 307a field on the GUI 300a are then once again shown to the user with updated values of variables at the taintpoint at which the process has paused. In an embodiment, when the user clicks the monitor 305b button, variables of the process in central module 104 and their current state value are displayed in the monitor display and input area 307a, not just those that are designated as tainted. In such an embodiment, process variables may be displayed. Alternately, in another embodiment, not only tainted variables, but process variables that touch the content or value of variables with set taintpoints may be displayed (e.g. in the example above where a watch point may be put on variable b, if instead a taintpoint using the defined embodiments herein was set on variable b, although d=c, and c=b, wherein d is not directly assigned to variable b, the value of d would still be displayed throughout the taintpoint monitoring process of variable b). This is done in case the tainted value may merely be used as a stopping point through the process to examine the value of other variables, which may be helpful in problem diagnosis or troubleshooting, and can aid in quickly diagnosing the source of a problem by following a faulty data flow.

In this manner, a privacy data expert can observe the flow a variety of data throughout the process of central module 104 dynamically. This may include any confidential data, personal data of external users, or the administrator user's own personal data. A resume button may be present in the Monitor Display and Input 307a area, where when clicked would resume the process of central module 104.

In an embodiment, if tainted data or information goes to other taint-aware applications from the process of central module 104 (e.g. the application 505a of another central module 104), the original central module 104 may receive variable information and be able to detect taintpoints even in the other application to pause execution in the other application and display state variables at the taintpoint to the administrator user of the source module 102 as described above. In this manner, a user may be able to check the value of data at taintpoints across multiple linked taint-aware applications.

A further application of this process may be a simplification of regular debugging. A software developer, for example, may define a weather model using associated factors such as temperature, time of the year, historical weather patterns, etc., to make a machine learning model using a neural network to classify irregular weather patterns (using two nodes in the output layer as described above), and designate irregular weather patterns as tainted for further analysis. In this manner, through regular monitoring, the application processing will pause at every step where the tainted data is processed. In regular debugging, a software developer has to define a watchpoint for a variable, pause the processing every time the variable is accessed, delete the watchpoint, and repeat for every data point of concern. Here, the application can support a conditional taintpoint depending on the content of inputs alone, and can pause the application at every step where they are accessed automatically.

Another application of interactive taint mode monitoring of step 419 is injection attack prevention. Here, conditional rules can be input by the user in rules 309a to define where certain data should not flow into the input field. This data may be considered as tainted, and the process in step 419 will pause at every step where the tainted data is processed. This applies also to all parts of the tainted data and to derived data. If an add command, or concatenation command, is executed with only part of the data being tainted (e.g. A+B where A is tainted), then the result is also considered tainted, and the application is paused at every step where such a result is also processed. As a result, an application can be stopped immediately, for example, if the process in central module 104 is about to send string input data to an SQL database, where instead of a normal string, a malicious user has inputted a harmful SQL command to corrupt or take over the database.

Such a condition may comprise a termination condition (represented by step 423), wherein the process of central module 104 may be immediately terminated. When step 419 is being performed, a termination condition at step 423 may be monitored at regular intervals (e.g. 0-1000 ms), where if a termination condition is present ("YES" at step 423), then step 419 and the process of central module 104 are terminated immediately. Additionally, in the monitor display and input 307a area, a terminate button may be present for administrator users, where the administrator user can click such an area of 307a to set a termination condition as present, wherein in step 423 the process of the central module 104 is then terminated (e.g. upon seeing that the user is about to inject malicious SQL commands, etc.). Other manners in which a termination condition may be marked as present, at step 419 is where a certain amount of predetermined time (on the scale of seconds, minutes, hours, days, etc.) elapses, or after the process of central module 104 finishes in a normal manner.

Otherwise, if monitoring for a termination condition takes place, and a termination condition is not present, then the monitoring stops and goes back to the conduction of the taint analysis in step 415. Here, once again, depending on the taint mode specified as described above, the process continues to monitor in a passive or active manner, in steps 417 or 419 respectively, and termination condition monitoring is once again checked periodically in step 423. If no termination condition is reached once again, this process continues throughout these steps in a cyclical manner. It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   executing, by at least one processor, a collection routine to gather raw data from a user;
   receiving results of the collection routine in a form of the raw data from the user, which may be stored in a central data repository, by the at least one processor;
   executing commands to generate a graphic user interface (GUI), by the at least one processor;
   displaying the GUI, by the at least one processor;
   receiving user input from the GUI to designate at least one variable to be monitored for taint analysis;
   conducting, at regular intervals, a taint analysis to check the raw data against pre-defined rules to determine a taint status of tainted or not tainted of the raw data by the at least one processor;
   visually representing results of the taint analysis on the GUI;
   marking the raw data, at the regular intervals, as tainted or not tainted depending on the taint status by the at least one processor, wherein the marking the raw data as tainted comprises adding a pointer to a shadow memory pointing to a tainted data structure where the tainted raw data is stored, and wherein a null pointer is stored for raw data that is not tainted;
   identifying, by the at least one processor, one or more entries as tainted data based on the one or more entries being marked as tainted in the shadow memory;
   preventing, by the at least one processor, the one or more entries marked as tainted data in the shadow memory from entering a security sensitive area in a computing system, wherein one or more entries not marked as tainted data are allowed to proceed to the security sensitive area in the computing system; and deleting, by the at least one processor, the one or more entries identified as tainted data.

2. The method of claim 1, wherein the periodically discarding, further monitoring, or taking other action selectively on the tainted data comprises monitoring the tainted data at regular intervals in a passive manner, wherein the tainted data is logged for viewing later or is discarded.

3. The method of claim 1, wherein the periodically discarding, further monitoring, or taking other action selectively on the tainted data comprises monitoring the tainted data at regular intervals in an active manner, wherein the process is interrupted each time tainted data is accessed.

4. The method of claim 3, further comprising displaying a user prompt on the GUI, presenting an option to monitor the process at the interruption point, or to ignore and continue the process.

5. The method of claim 4, wherein when the monitor option is chosen:

displaying values of variables used in the process, at an interruption point, on the GUI.

6. The method of claim 1, wherein conducting the taint analysis comprises:

feeding the raw data as input to a neural network machine learning classifier, the neural network machine learning classifier having an input layer that receives the raw data as a plurality of inputs, and an output layer comprising first and second nodes, wherein the first node indicates a value representing a collective reliability of the raw data, and the second node indicates a value representing a collective unreliability of the raw data, wherein when the second node has a greater value than the first node, the raw data collectively is considered tainted, and when the first node has a greater value than the second node, the raw data collectively is considered not tainted.

7. The method of claim 1, wherein the inputting comprises inputting only data marked as not tainted.

8. The method of claim 1, wherein the marking comprises:

marking the raw data based on a comparison between a source of the raw data and a list of untrustworthy sources of data.

9. The method of claim 1, further comprising:

identifying a tainted variable from the tainted data;

logging two or more values of the tainted variable as it is processed; and displaying the logged two or more values of the tainted variable.

10. A system, comprising:

a. memory; and at least one processor coupled to the memory and configured to:

execute a collection routine to gather raw data from a user;

store the raw data in a central data repository;

execute commands to generate a graphic user interface (GUI);

display the GUI;

receive user input from the GUI to designate at least one variable to be monitored for taint analysis;

conduct, at regular intervals, a taint analysis to check the raw data against pre-defined rules to determine a taint status of tainted or not tainted of the raw data;

visually represent results of the taint analysis on the GUI;

mark the raw data, at the regular intervals, as tainted or not tainted depending on the taint status by the at least one processor, wherein the marking the raw data as tainted comprises adding a pointer to a shadow memory pointing to a tainted data structure where the tainted raw data is stored, and wherein a null pointer is stored for raw data that is not tainted;

identify one or more entries as tainted data based on the one or more entries being marked as tainted in the shadow memory;

prevent the one or more entries marked as tainted data in the shadow memory from entering a security sensitive area in a computing system, wherein one or more entries not marked as tainted data are allowed to proceed to the security sensitive area in the computing system; and delete the one or more entries identified as tainted data.

11. The system of claim 10, wherein to periodically discard, further monitor, or take other action selectively on the tainted data the at least one processor is further configured to: monitor the tainted data at regular intervals in a passive manner, wherein tainted data is logged for viewing later or is discarded.

12. The system of claim 10, wherein to periodically discard, further monitor, or take other action selectively on the tainted data the at least one processor is further configured to:

monitor the tainted data at regular intervals in a passive manner, wherein tainted data is logged for viewing later or is discarded.

13. The system of claim 12, wherein the at least one processor is further configured to:

display a user prompt on the GUI, presenting an option to monitor the process at an interruption point, or to ignore and continue the process.

14. The system of claim 13, wherein when the monitor option is chosen, the at least one processor is further configured to:

display values of variables used in the process, at the interruption point, on the GUI.

15. The system of claim 10, wherein to conduct the taint analysis, the at least one processor is further configured to:

feed the raw data as input to a neural network machine learning classifier, the neural network machine learning classifier having an input layer that receives the raw data as a plurality of inputs, and an output layer comprising first and second nodes, wherein the first node indicates a value representing a collective reliability of the raw data, and the second node indicates a value representing a collective unreliability of the raw data, wherein when the second node has a greater value than the first node, the raw data collectively is considered tainted, and when the first node has a greater value than the second node, the raw data collectively is considered not tainted.

16. A non-transitory computer-readable device having instructions stored thereon that, when executed by at least one computing device, cause the at least one computing device to perform operations comprising:

executing a collection routine to gather raw data from a user;

receiving results of the collection routine in a form of the raw data from the user, which may be stored in a central data repository;

executing commands to generate a graphic user interface (GUI);

displaying the GUI;

receiving user input from the GUI to designate at least one variable to be monitored for taint analysis;

conducting, at regular intervals, a taint analysis to check the raw data against pre-defined rules to determine a taint status of tainted or not tainted of the raw data;

visually representing results of the taint analysis;

marking the raw data, at the regular intervals, as tainted or not tainted depending on the taint status by the at least one processor, wherein the marking the raw data as tainted comprises adding a pointer to a shadow memory pointing to a tainted data structure where the tainted raw data is stored, and wherein a null pointer is stored for raw data that is not tainted;

identifying one or more entries as tainted data based on the one or more entries being marked as tainted in the shadow memory;

preventing the one or more entries marked as tainted data in the shadow memory from entering a security sensitive area in a computing system, wherein one or more entries not marked as tainted data are allowed to proceed to the security sensitive area in the computing system; and deleting the one or more entries identified as tainted data.

17. The device of claim 16, the operations of periodically discarding, further monitoring, or taking other action selectively on the tainted data further comprising:

monitoring the tainted data at regular intervals in a passive manner, wherein the tainted data is logged for viewing later or is discarded.

18. The device of claim 16, the operations of periodically discarding, further monitoring, or taking other action selectively on the tainted data further comprising:

monitoring the tainted data at regular intervals in an active manner, wherein the process is interrupted each time tainted data is accessed.

19. The device of claim 18, the operations further comprising:

displaying a user prompt on the GUI, presenting an option to monitor the process at the interruption point, or to ignore and continue the process.

20. The device of claim 19, wherein when the monitor option is chosen, the operations further comprise:

displaying values of variables used in the process, at the interruption point, on the GUI.

* * * * *